US009294994B2

(12) United States Patent
Yu et al.

(10) Patent No.: US 9,294,994 B2
(45) Date of Patent: Mar. 22, 2016

(54) USER EQUIPMENT BATTERY SAVING IN A HETNET DEPLOYMENT WITH EICIC (75) Inventors: Yi Yu, Reston, VA (US); Yi Song, Plano, TX (US); Zhijun Cai, Euless, TX (US); Mo-han Fong, Sunnyvale, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/984,625

(22) PCT Filed: Feb. 11, 2011
(Under 37 CFR 1.47)

(86) PCT No.: PCT/US2011/024555
§ 371 (c)(1),
(2), (4) Date: Aug. 9, 2013

(87) PCT Pub. No.: WO2012/108880
PCT Pub. Date: Aug. 16, 2012

(65) Prior Publication Data
US 2013/0315092 A1  Nov. 28, 2013

(51) Int. Cl.
*H04L 12/26* (2006.01)
*G08C 17/00* (2006.01)
(Continued)

(52) U.S. Cl.
CPC ...... *H04W 52/0203* (2013.01); *H04W 52/0216* (2013.01); *Y02B 60/50* (2013.01)

(58) Field of Classification Search
CPC ... H04L 1/0001; H04L 1/0025; H04L 1/0026; H04L 1/0027; H04L 1/16; H04L 1/20; H04L 1/1671; H04L 1/1812; H04L 1/1887; H04L 5/0032; H04L 5/005; H04L 5/0051; H04L 5/0073; H04L 5/0078; H04L 5/0091; H04L 5/0092; H04L 5/0094; H04L 5/0098;
(Continued)

(56) References Cited

U.S. PATENT DOCUMENTS 8,787,231 B2 * 7/2014 Jeong et al. .................. 370/311
8,838,125 B2 * 9/2014 Dalsgaard et al. ........... 455/450
(Continued)

FOREIGN PATENT DOCUMENTS

WO  2009/033253  3/2009
WO  2009/114802  9/2009

OTHER PUBLICATIONS

Communication Pursuant to Article 94(3) EPC issued in European Application No. 11705761.2 on Jun. 19, 2014; 6 pages.
(Continued)

*Primary Examiner* — Tri H Phan
(74) *Attorney, Agent, or Firm* — Fish & Richardson P.C.

(57) ABSTRACT

Devices and methods are provided for reducing client node power consumption when monitoring first and second channels corresponding to first and second access nodes in a heterogeneous wireless-enabled communications environment. Enhanced Inter-Cell Interference Coordination (eICIC) operations are performed to mitigate interference between a first access node and a second access node. The client node monitors first and second channels corresponding to the first and second access nodes. The client node receives restricted measurement data transmitted on the first channel, which is then processed to schedule cessation of monitoring the first channel to reduce power consumption and thereby conserve battery resources.

18 Claims, 4 Drawing Sheets

(51) Int. Cl.
*H04W 4/00* (2009.01)
*H04J 3/17* (2006.01)
*H04W 72/00* (2009.01)
*H04B 7/00* (2006.01)
*H04W 52/02* (2009.01)

(58) Field of Classification Search
CPC .... H04L 5/1469; H04L 12/2602; H04L 43/00; H04B 7/0413; H04B 7/0626; H04J 11/0023; H04J 11/005; H04J 11/0056; Y02B 60/50; H04W 24/00; H04W 24/02; H04W 24/06; H04W 24/08; H04W 24/10; H04W 28/04; H04W 28/048; H04W 36/0011; H04W 36/0088; H04W 36/30; H04W 40/24; H04W 48/02; H04W 48/12; H04W 48/16; H04W 52/0203; H04W 52/0216; H04W 52/0229; H04W 52/0225; H04W 52/0274; H04W 52/38; H04W 52/50; H04W 52/58; H04W 52/143; H04W 52/241; H04W 52/243; H04W 52/244; H04W 52/322; H04W 52/325; H04W 56/001; H04W 56/0045; H04W 72/00; H04W 72/042; H04W 72/082; H04W 72/085; H04W 72/12; H04W 72/1226; H04W 72/1231; H04W 72/1263; H04W 72/1278; H04W 72/1289; H04W 74/002; H04W 74/04; H04W 74/0866; H04W 76/048; H04W 84/045; H04W 84/12
USPC ......... 370/203–211, 229–240, 252, 310–350, 370/431–433, 437–439, 464–465, 468, 370/477–480; 455/7–17, 431–466, 515, 455/522, 563
See application file for complete search history.

(56) References Cited

U.S. PATENT DOCUMENTS

| | | | |
|---|---|---|---|
| 8,885,509 B2* | 11/2014 | Suzuki | 370/252 |
| 8,964,672 B2* | 2/2015 | Suzuki et al. | 370/329 |
| 2008/0186892 A1 | 8/2008 | Damnjanovic | |
| 2012/0113812 A1* | 5/2012 | Ji et al. | 370/241 |
| 2012/0113843 A1* | 5/2012 | Watfa et al. | 370/252 |
| 2013/0033998 A1* | 2/2013 | Seo et al. | 370/252 |
| 2013/0114434 A1* | 5/2013 | Muruganathan et al. | 370/252 |
| 2013/0223268 A1* | 8/2013 | Jung et al. | 370/252 |
| 2013/0223409 A1* | 8/2013 | Jung et al. | 370/331 |
| 2014/0254537 A1* | 9/2014 | Kim et al. | 370/329 |
| 2014/0321388 A1* | 10/2014 | Jeong et al. | 370/329 |
| 2015/0078281 A1* | 3/2015 | Kishiyama et al. | 370/329 |

OTHER PUBLICATIONS

International Search Report and Written Opinion of the International Searching Authority issued in International Application No. PCT/US2011/024555 on Oct. 20, 2011; 11 pages.

International Search Report issued in International Application No. PCT/US2011/024537 on Oct. 28, 2011; 13 pages.

Alcatel-Lucent; "Blank Subframes for LTE"; 3GPP TSG RAN WG1 Meeting #58 (R1-093340); Shenzhen, China; Aug. 24, 2009; 2 pages.

CATT; "Discussion on Measurement Restrictuion Requirement of eICI"; 3GPP TSG RAN Meeting #72 (R2-106534); Jacksonville, Florida; Nov. 15-19, 2010; 3 pages.

CMCC; "Considerations on Measurement Resource Restriction for eICIC"; 3GPP TSG-RAN WG2 Meeting #72 (R2-106381); Jacksonville, Florida; Nov. 15-19, 2010; 4 pages.

ETSI/MCC; "Report of 3GPP TSG RAN WG2 Meeting #72"; TSG-RAN Working Group 2 Meeting #72bis (R2-110679); Dublin, Ireland; Jan. 17-21, 2011; 166 pages.

Nokia; "Active Mode DRX"; 3GPP TSG-RAN WG2 Meeting #55 (R2-062752); Seoul, Korea; Oct. 9-13, 2006; 3 pages.

Renesas Electronics Europe; "Power Consumption and Other Practical Considerations for eICIC Measurement Requirements"; 3GPP TSG-RAN WG4 Meeting #57AH (R2-110340); Austin, Texas; Jan. 17-21, 2011; 7 pages.

Research in Motion UK Limited; "Measurement and Configuration for eICIC"; 3GPP TSG RAN WG2 Meeting #72 (R2-106622); Jacksonville, Florida; Nov. 15-19, 2010; 2 pages.

Research in Motion UK Limited; "UE Power Saving for eICIC"; 3GPP TSG RAN WG2 Meeting #73 (R2-111233); Taipei, Taiwan; Feb. 21-25, 2011; 3 pages.

Wigard, J. et al.; "On the User Performance of LTE UE Power Savings Schemes with Discontinuous Reception in LTE"; IEEE International Conference; Communications Workshops; Piscataway, New Jersey; Jun. 14, 2009; 5 pages.

ZTE; "Discussion on Measurement Restriction of eICIC"; 3GPP TSG-RAN WG2 Meeting #72 (R2-106332); Jacksonville, Florida; Nov. 15-19, 2010; 5 pages.

Communication under Rule 71(3) EPC issued in European Application No. 11705761.2 on Dec. 9, 2014; 46 pages.

* cited by examiner

USER EQUIPMENT BATTERY SAVING IN A HETNET DEPLOYMENT WITH EICIC

CLAIM OF PRIORITY

This application is a U.S. National Stage of PCT/US2011/024555 filed on Feb. 11, 2011.

BACKGROUND OF THE INVENTION

1. Field of the Invention

The present invention is directed in general to communications systems and methods for operating same. In one aspect, the present invention relates to the devices and methods for reducing power consumption of a client node when performing channel monitoring operations within a heterogeneous wireless-enabled communications environment.

2. Description of the Related Art

Today's next generation cellular networks, such as those based on Third Generation Partnership Program (3GPP) Long Term Evolution (LTE)-Advanced (LTE-A), generally involve implementation of heterogeneous communication technologies. In these implementations, low power network nodes are typically placed to overlay traditional high-power Evolved Universal Terrestrial Radio Access Network (E-UTRAN) Node B (eNB) nodes to expand network coverage and to increase system capacity. Currently, two types of implementations have been discussed. The first is macro-pico, where a low-power picocell is accessible to all client nodes. The second is macro-femto, where a low power femtocell is only accessible by a predetermined group of client nodes having a closed subscription.

In these implementations, if a different carrier frequency is used for the pico/femtocell than that which is used for the macrocell, then it is referred to as a carrier aggregation (CA)-based heterogeneous implementation. Since a different frequency band is used for the pico/femtocell transmission and reception, client nodes using the pico/femtocell experience minimum interference from the macro eNB. Likewise, client nodes using the macro eNB experience minimum interference from the picofemto eNB. However, CA-based heterogeneous implementations require the acquisition of two separate radio frequency bands, which could prove to be inconvenient and costly. Accordingly, use of the same carrier transmission frequency for both macro and pico/femtocells, referred to as a non-CA-based heterogeneous implementation, is desirable for efficient use of radio resources.

For a non-CA-based heterogeneous implementation, the picocell, femtocell and macrocell share the same radio frequency spectrum to provide services to the client node. Full frequency reuse is possible in such implementations, which could maximize the system spectral efficiency. However, frequency reuse among picocells, femtocells and macrocells could cause strong inter-cell interference and degrade system performance. As a result, enhanced inter-cell interference coordination (eICIC) for non-CA-based implementations have been proposed as a work item in 3GPP to improve the interference condition of a heterogeneous network. Yet current implementations of eICIC incur additional processing operations that result in higher power consumption, which in turn reduces a client node's battery reserves. In view of the foregoing, it would be advantageous to conserve client node battery reserves when eICIC techniques are implemented in a non-CA-based implementation.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Devices and methods are provided for reducing power consumption of a client node when performing channel monitoring operations within a heterogeneous wireless-enabled communications environment. In various embodiments, Enhanced Inter-Cell Interference Coordination (eICIC) operations are performed to mitigate interference between a first access node and a second access node. In these and other embodiments, a client node is notified with the restricted measurement set data. When received, the client node ceases monitoring some of the subframes of the channel to reduce power consumption and thereby conserve battery resources. The client node may also be notified with the scheduling option explicitly, for example, via the Radio Resource Control (RRC) signaling or Medium Access Control (MAC) Control Element (CE). Likewise, the client node may be notified implicitly, for example, when the client node is notified with the restricted measurement set data. The client node may likewise be assigned a pre-configured scheduling option by default.

In one embodiment, the first access node corresponds to a macrocell and the second access node corresponds to a picocell. In another embodiment, the first access node corresponds to a femtocell and the second access node corresponds to a macrocell. In various embodiments, the restricted measurement set data may comprise Channel State Information (CSI) measurement set data, Radio Resource Management (RRM) measurement set data, or Radio Link Management (RLM) measurement set data. In these and other embodiments, the scheduling option includes a scheduling indicator value that is used by the node to schedule the monitoring of a Physical Downlink Control Channel (PDCCH). In one embodiment, the monitoring operations are scheduled to be performed only on subframes associated with the restricted measurement set data. In another embodiment, the monitoring operations are scheduled to be performed on subframes not associated with the restricted measurement set data. In one embodiment, the scheduling indicator value is communicated to the client node in a Radio Resource Control (RRC) message or Medium Access Control (MAC) Control Element (CE).

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Figure 1:
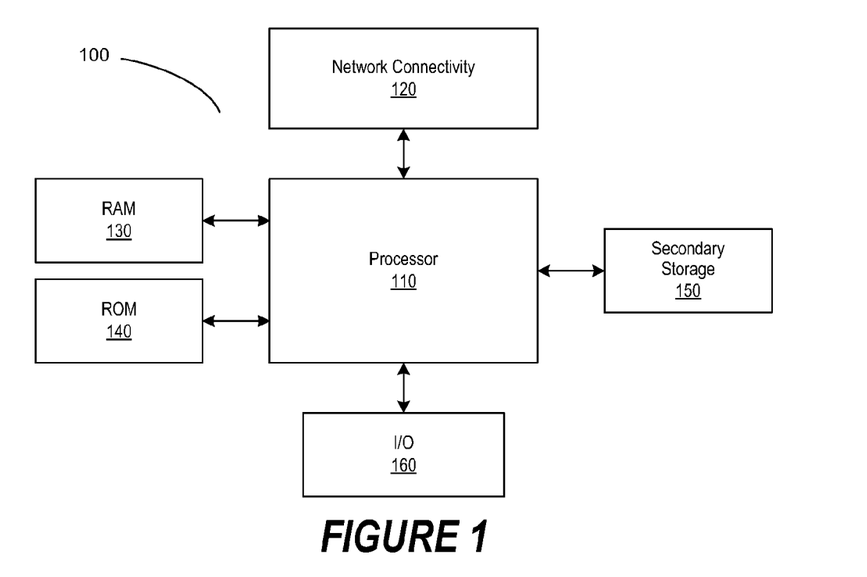
FIG. 1 depicts an exemplary system in which the present invention may be implemented.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
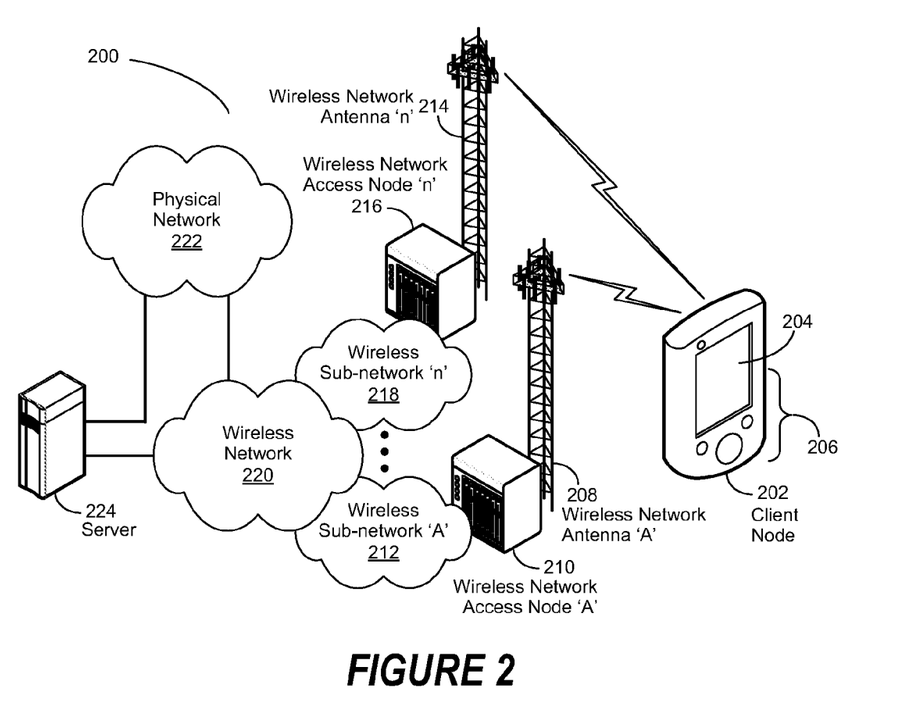
FIG. 2 shows a wireless communications system including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n'

216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
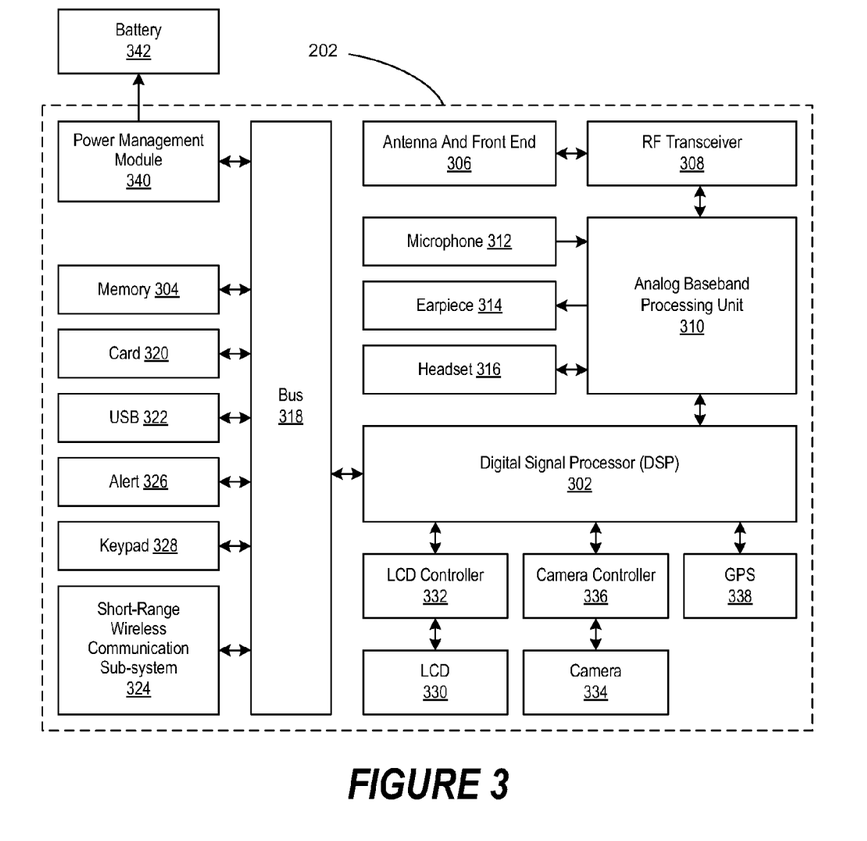
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, an input/output (I/O) interface 318, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. The power management module 340 is operably coupled to a power storage unit (e.g., battery 342) and is operable to monitor the status of the battery and to distribute power from the battery 342 to various functional modules within the client node 202 using techniques known by those of skill in the art. Various other peripherals may also be included to provide additional functions, such as radio and television reception.

Figure 4:
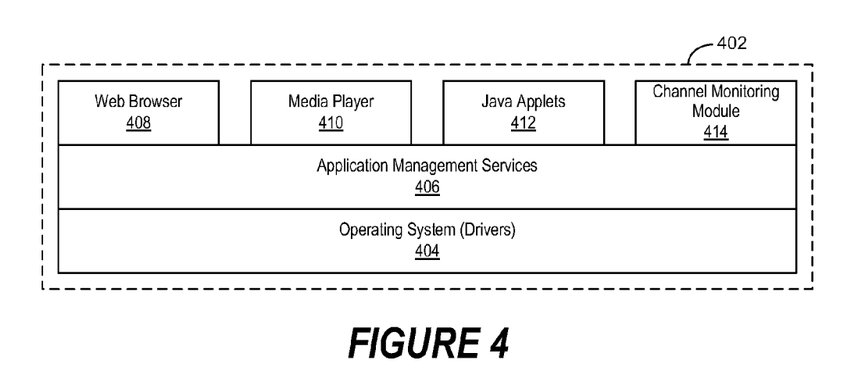
FIG. 4 is a simplified block diagram of a software environment that may be implemented by the DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. The channel monitoring module 414 is operable to control processing logic in the client node that is used to monitor various access node channels in a plurality of cells. In various embodiments described herein, the channel monitoring module 414 configures the client node 202 to temporarily cease channel monitoring operations on a predetermined transmission channel of a predetermined access node, as described in greater detail herein. The portion of the client node processing logic used to monitor the predetermined channel is temporarily powered-down and, therefore, power consumption of the client node's 202 power storage unit is reduced when the channel monitoring operations are ceased. In various embodiments, the client node 202, the wireless network nodes 'A' 210 through 'n' 216, and the server node 224 shown in FIG. 2 may likewise include a processing component that is capable of executing instructions related to the actions described above.

Figure 5:
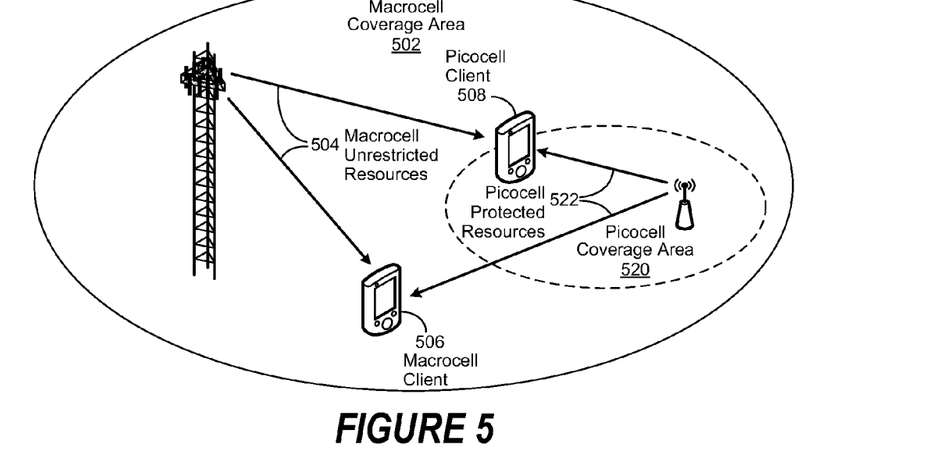
FIG. 5 is a generalized illustration of a wireless-enabled communications environment as implemented in accordance with an embodiment of the invention to reduce client node power consumption when performing channel monitoring operations corresponding to a macrocell and a picocell.

FIG. 5 is a generalized illustration of a wireless-enabled communications environment as implemented in accordance with an embodiment of the invention to reduce client node power consumption when performing channel monitoring operations corresponding to a macrocell and a picocell. In this embodiment, a macrocell coverage area ("macrocell") 502 comprises a picocell coverage area ("picocell") 520. As shown in FIG. 5, the client node device ("macro client") 506 uses unrestricted macrocell resources 504 to communicate within the macrocell 502. Likewise, the client node ("pico client") 508 may selectively use protected picocell resources 522 to communicate within the picocell 520, or alternatively, unrestricted macrocell resources 504. Accordingly, there is a need for reducing power consumption of a picocell client 508 and a macrocell client 506 when respectively performing channel monitoring operations corresponding to the picocell protected resources 522 and the macrocell unrestricted resources 504.

In various embodiments, interference conditions are encountered when the picocell client 508 is on the edge of the picocell 520, such as when the picocell 520 is used to offload traffic from the macrocell 502. In other embodiments, interference conditions are encountered when the macrocell client 506, which is not a member of the closed subscriber group of a femtocell, is in close proximity to the femtocell. In these cases, the conventional use of enhanced inter-cell interference coordination (eICIC) may not be as effective as desired in mitigating control channel interference. As a result, enhanced co-channel interference management is necessary to allow such victim clients 506, 508 to remain connected to the serving nodes respectively servicing the macrocell 502 and the picocell 520.

Accordingly, a time-domain solution is typically implemented for mitigating the aforementioned interference. In various embodiments, in the case of macro-pico interference, a restricted resource set (e.g., a set of subframes) of a picocell is designated as a "protected" resource 522 under strong inter-cell interference. In this embodiment, interference is mitigated by the macrocell freeing up its resources corresponding to the picocell's protected resources. In various other embodiments, in the case of a macro-femto scenario, a restricted resource set is configured at a femto Enhanced Node B (eNB) to mitigate interference for the macro client 506.

Figure 6:
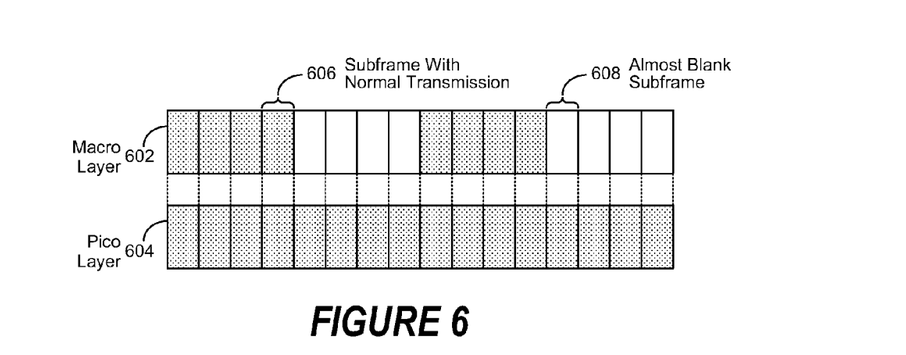
FIG. 6 is a simplified illustration of the implementation of Almost Blank Subframes (ABS) to reduce client node power consumption when performing channel monitoring operations corresponding to a macrocell and a picocell.

FIG. 6 is a simplified illustration of the implementation of Almost Blank Subframes (ABS) in accordance with an embodiment of the invention to reduce client node power consumption when performing channel monitoring operations corresponding to a macrocell and a picocell. Skilled practitioners of the art will be familiar with ABS, which is a technique adopted in 3GPP Rel-10 to mitigate interference encountered by picocell clients from a macrocell, and conversely, the interference encountered by macrocell clients from a femtocell. When ABS is implemented, the control region and the data region are blanked on the macrocell in the case of mitigating macrocell-picocell interference and only the reference signal itself is transmitted. Conversely, the control region and the data region are blanked on the femtocell in the case of mitigating macrocell-femtocell interference.

Those of skill in the art will realize that if the Primary Synchronization Signal (PSS), Secondary Synchronization Signal (SSS), Physical Broadcast Channel (PBCH), System Information Block (SIB1), Paging, or Positioning Reference Signal (PRS) coincide with ABS, they are transmitted in the ABS, with associated Physical Downlink Control Channel (PDCCH) when SIB1 or Paging is transmitted. Likewise, the Common Reference Signal (CRS) is transmitted on ABS to avoid affecting 3GPP Rel-8/9 client node channel estimation and Radio Resource Management RRM, Radio Link Management (RLM) or Channel Quality Indicator (CQI) calculations. To further reduce the interference from CRS in a data region, ABS is typically configured as a Multimedia Broadcast over Single Frequency Network (MBSFN) subframe whenever possible. Skilled practitioners of the art will likewise be aware that subframe #0, #4, #5, and #9 cannot be MBSFN subframes due to PSS, SSS, PBCH, SIB1, or Paging.

Referring now to FIG. 6, ABS is implemented to mitigate interference between a macrocell and a picocell in a wireless-enabled communications environment. In this embodiment, the macro layer 602 of the macrocell comprises normal transmission subframes 606 that are muted by implementation of ABS 608 when the picocell uses the corresponding normal transmission subframes of the pico layer 604 to communicate with picocell-edge-clients. Accordingly, interference from the dominant interferer is reduced. During non-implementation of the ABS 608, the pico node typically schedules picocell-center-clients with strong signal power, which has relatively high tolerance to macrocell interference.

In various embodiments, three types of client nodes coexist within the previously described heterogeneous network environment: picocell-center-clients, picocell-edge-clients, and macrocell clients. In these and other embodiments, some pico clients will have stronger downlink received signal power from the macro cell (i.e., the interferer) than from the picocell (i.e., the serving cell), especially if range expansion is applied to enhance the picocell coverage. Accordingly, the percentage of picocell-edge-clients is likely greater than in a traditional homogeneous network environment. As a result, with more picocell-edge-clients existing in the system, it is also likely that a larger incidence of ABS would be used to serve those clients which are sensitive to the dominant interference from the macrocell. However, increasing the number of ABS has the negative effect of limiting the macrocell capacity.

In various embodiments, picocell-edge-clients may not be scheduled at the non-ABS subframes due to the high interference on the Physical Downlink Control Channel (PDCCH). In these and other embodiments, since ABS resources are limited, picocell-center-clients are scheduled at non-ABS subframes as much as possible to save the limited ABS resources for those clients which need them the most. In various embodiments, one or more of three scheduling options are implemented within the picocell: 1) ABS-only; 2) non-ABS-only; and 3) both-ABS-and-non-ABS. In these various embodiments, there is a high possibility that picocell-edge-clients will be scheduled with option 1, picocell-center-clients will be scheduled with option 2, and those picocell clients with intermediate Signal to Interference plus-Noise Ratio (SINR) will be scheduled with option 3. For macrocell clients, there is only one scheduling option: non-ABS, as it is not possible to schedule a macrocell client during ABS.

From the foregoing, skilled practitioners of the art will realize that the consumption of battery resources may be reduced by classifying clients into different scheduling options at the picocell and macrocell. As an example, it would not be necessary to monitor PDCCH during non-ABS for picocell-edge-client if the client node would be scheduled only at ABS. Similarly, for picocell-center-clients, it would not be necessary to monitor PDCCH during ABS if the client node would be scheduled only at non-ABS. For macrocell clients, it would not be necessary to monitor PDCCH during ABS. By not monitoring PDCCH, the portion of the client node processing logic used to monitor the predetermined channel is temporarily powered-down and, therefore, power consumption of the client node's 202 power storage unit is reduced when the channel monitoring operations are ceased.

In various other embodiments, the ABS pattern is not explicitly provided to the client node. Instead, one or more restricted measurement set(s) are provided to the client node. In these and other embodiments, the restricted measurement sets include Channel State Information (CSI) measurement set, Radio Resource Management (RRM) measurement set, or Radio Link Monitoring (RLM) measurement set. Once received, they are processed by the client node to reduce monitoring operations of possible resource allocation on those subframes associated with the restricted measurement set(s). In one embodiment, the restricted measurement sets may be subsets of the ABS pattern.

Figure 7:
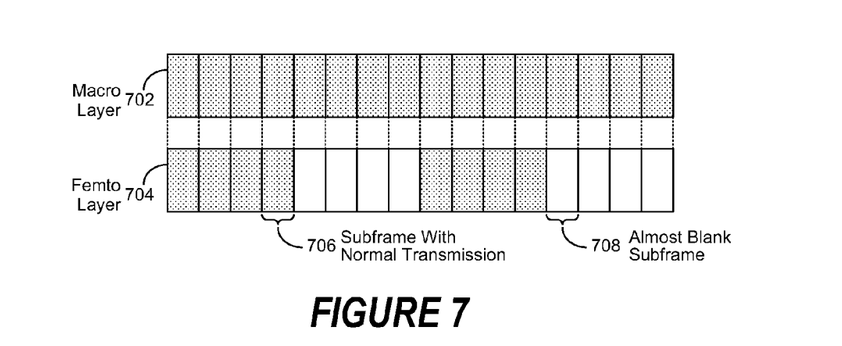
FIG. 7 is a simplified illustration of the implementation of ABS to reduce client node power consumption when performing channel monitoring operations corresponding to a macrocell and a femtocell.

FIG. 7 is a simplified illustration of the implementation of Almost Blank Subframe (ABS) in accordance with an embodiment of the invention to reduce client node power consumption when performing channel monitoring operations corresponding to a macrocell and a femtocell. In this embodiment, the femto layer 704 of the femtocell comprises normal transmission subframes 706 that are muted by implementation of ABS 708 when the macrocell uses the corresponding normal transmission subframes of the macro layer 702 to communicate with a macrocell client that is in close proximity to the femtocell. Accordingly, interference from the dominant interferer is reduced. However, it will be appreciated that macrocell and femtocell capacity is decreased as a result of reduced subframe resources with the introduction of ABS in a heterogeneous network environment. As a result, the ABS pattern requires appropriate configuration to provide optimum service quality and throughput to both pico/femto clients and macrocell clients alike.

The consumption of client node battery resources can also be reduced in a macro-femto co-channel implementation in which the femto clients would not need to monitor PDCCH during the ABS and the macro clients close to femtocells would not need to monitor PDCCH during the non-ABS if they are scheduled during ABS only. In this embodiment, the femto clients would need to monitor PDCCH of this subframe if the femto SIB1/paging is transmitted in an ABS.

Figure 8:
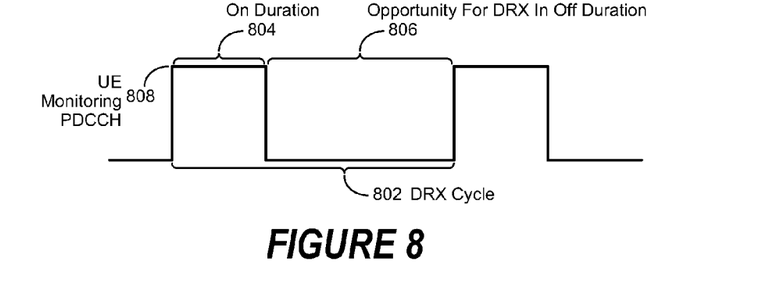
FIG. 8 is a simplified illustration of the monitoring a Physical Downlink Control Channel (PDCCH) during a Discontinuous Reception (DRX) channel cycle to reduce client node power consumption.

FIG. 8 is a simplified illustration of the monitoring a Physical Downlink Control Channel (PDCCH) during a Discontinuous Reception (DRX) cycle as implemented in an embodiment of the invention to reduce client node power consumption. Skilled practitioners of the art will be aware that client node battery saving is currently enabled by DRX functionality in Evolved Universal Terrestrial Radio Access Network (E-UTRAN) implementations. In these implementations, the client node may be configured by Radio Resource Control (RRC) with a DRX functionality that controls the client node's PDCCH monitoring activity for the client node's Cell Radio Network Temporary Identifier (C-RNTI), Transmit Power Control (TPC)-Physical Uplink Control Channel (PUCCH)-Radio Network Temporary Identifier (RNTI), Transmit Power Control (TPC)-Physical Uplink Shared Channel (PUSCH)-Radio Network Temporary Identifier (RNTI), and Semi-Persistent Scheduling (SPS)-C-RNTI, if configured. Likewise, when in RRC_Connected mode, the client node is allowed to monitor the PDCCH discontinuously using the specified DRX operation if DRX is configured. Likewise, a DRX cycle 802 is defined within these implementations as a periodic repetition of the On Duration 804, followed by a possible period of inactivity. During the On Duration 804, the client node monitors 808 the PDCCH during the Off Duration 806, the client node may enter a sleep mode if no inactivity timer or retransmission timer is triggered.

As shown in FIG. 8, the DRX cycle 802 is configured as a periodic pattern. In this embodiment, the On Duration 804 timer, the DRX cycle 802, and other DRX values are controlled by the network to define the behavior of the client node DRX implementation. When a DRX cycle 802 is configured, the Evolved Node B (eNB) restricts downlink (DL)/uplink (UL) allocations to the client node within the active time if possible. The client node is not required to monitor 808 the PDCCH for DL/UL allocations during the DRX off duration. However, those of skill in the art will realize that the DRX cycle 802 does not reconcile with the ABS pattern used in Enhanced Inter-cell Interference Coordination (eICIC). As an example, as agreed in RAN1 #62bis, the ABS pattern will be periodical with a 40 ms or 8 ms periodicity for Frequency Division Multiplex (FDD) systems.

Likewise, Radio Resource Control (RRC) signaling is used to notify the client node about the resource-specific Radio Link Management (RLM)/Radio Resource Management (RRM) measurement regarding the ABS pattern, while a bitmap pattern is used to indicate the ABS pattern of macrocell to picocell over X2 signaling. The ABS pattern can also be updated semi-statically to allow adjustments based on traffic loading conditions. In various embodiments, a variety of ABS patterns, including non-contiguous ABS patterns, may be provided. Due to the possible non-contiguous ABS pattern and the fixed 40 ms or 8 ms periodicity of the ABS pattern, those of skill in the art will realize that it is difficult to align the DRX cycle with the ABS pattern in order to reduce client node battery consumption. Furthermore, DRX is a complicated procedure consisting of various timers (e.g., inactivity timer, retransmission timer, etc.). Skilled practitioners of the art will likewise realize that it is not practical to configure DRX parameters to match the ABS pattern for the purpose of client node battery power savings given the complex nature of DRX operation.

Figure 9:
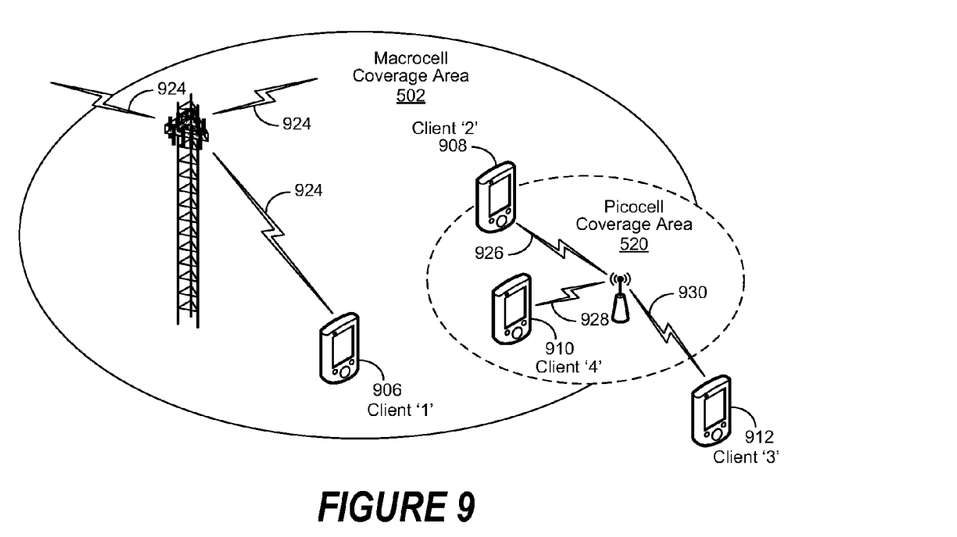
FIG. 9 is a generalized illustration of the implementation of ABS scheduling to reduce client node power consumption.

FIG. 9 is a generalized illustration of the implementation of Almost Blank Subframe (ABS) scheduling in accordance with embodiments of the invention to reduce client node power consumption. In these embodiments, a macrocell coverage area ("macrocell") 502 comprises a picocell coverage area ("picocell") 520. As shown in FIG. 9, client node '1' 906 primarily communicates within macrocell 502, while client node '2' 908 may communicate within macrocell 502, but instead, communicates within picocell 520 since it operates on its cell edge or extended cell edge. As likewise shown in FIG. 9, client node '4' 910 communicates primarily within the picocell 520, while client node '3' 912 is outside of the picocell 520 and as a result, may have lost communication. Accordingly, client node '1' 906 is referred herein as a "macro client," client node '2' 908 as a "picocell-edge-client," and client node '4' 910 as a "picocell-center-client." In this and other embodiments, the battery consumption of the client nodes '1' 906, '2' 908, '3' 912, and '4' 910 is reduced by implementing eICIC with various scheduling options.

In one embodiment, the client node is scheduled for possible allocation only at ABS ("only-ABS"), due to its sensitivity to macrocell interference, or alternatively, femtocell interference. In this embodiment, the client node '2' 908 (e.g., a picocell-edge-client) only monitors the Physical Downlink Control Channel (PDCCH) for possible allocation at ABS. In another embodiment, the client node '1' 906 (e.g., a macro client) may likewise implement the only-ABS scheduling if the macro client is in close proximity to femtocells. In certain of these embodiments, the client node '1' may not monitor PDCCH or perform blind decoding for the client node's Cell Radio Network Temporary Identifier (C-RNTI), Transmission Power Control (TPC)-Physical Uplink Control Channel (PUCCH)-Radio Network Temporary Identifier (RNTI), Transmission Power Control (TPC)-Physical Uplink Shared Channel (PUSCH)-Radio Network Temporary Identifier (RNTI), and Semi-Persistent-Scheduling (SPS) C-RNTI, if configured.

In one embodiment, the client node is scheduled at the subframes that are not ABS ("non-ABS"). In this embodiment, the non-ABS scheduling is applied to the client node '1' 906 (e.g., a macrocell client). In another embodiment, the non-ABS scheduling is applied to the client node '4' 910 (e.g., a picocell-center-client). Skilled practitioners of the art will realize that scheduling during non-ABS reduces client node batter consumption, and accordingly, this embodiment is advantageous when applied to the client node '1' 906 (e.g., a macro client). These same skilled practitioner will also appreciate that, due to limited ABS resources, it may also be desirable to schedule picocell-center-clients (e.g., client node '4' 910) at non-ABS and thus the ABS resources can be left to picocell-edge-clients (e.g., client node '2' 908) that cannot be scheduled at non-ABS resources. In another embodiment, the non-ABS scheduling option can be implemented with femto clients and macro clients (e.g., client node '1' 906) that are not within the coverage of femtocells.

In one embodiment, the client node is scheduled for possible allocation during both-ABS-and-non-ABS. In this embodiment, the client node continuously monitors all the subframes, including ABS and non-ABS. In another embodiment, this scheduling option is implemented with picocell clients (e.g., client nodes '2' 908, '3' 912, and '4' 910) with intermediate Signal to Interference plus-Noise Ratio (SINR). For those client nodes, both-ABS-and-non-ABS is used for possible allocations. Likewise, different PDCCH aggregation level and Modulation and Coding Scheme (MCS) level may be used for the both-ABS-and-non-ABS scheduling. The picocell 520 can flexibly choose which subframe to schedule for those client nodes (e.g., client nodes '2' 908, '3' 912, and '4' 910), depending on the ABS resource availability, loading condition, Quality of Service (QoS) requirements, etc. If the client node (e.g., client nodes '2' 908, '3' 912, and '4' 910) is configured with this scheduling option, it may not save battery power since as it needs to monitor all the subframes. However, by adding this scheduling option, it allows the picocell 520 to flexibly assign resources to the client nodes (e.g., client nodes '2' 908, '3' 912, and '4' 910) such that the overall cell capacity can be improved and also the QoS of both a picocell-center (e.g., client node '4' 910) and a picocell-edge client node (e.g., client node '2' 908) can be satisfied. In yet another embodiment, the both-ABS-and-non-ABS scheduling option is applied to macrocell client nodes (e.g., client node '1' 906), that are not within the coverage of femtocells.

Referring now to FIG. 9, an example of ABS scheduling options in a macrocell 502 and a picocell 520 is illustrated. In this example, two ABS subframes are assigned per radio frame. Therefore, picocell-edge-client nodes (e.g., client node '2' 908) only needs to monitor 20% of the subframes, which equates to a power savings of approximately 80% in RRC_Connected mode for downlink reception. Conversely, macrocell client nodes (e.g., client node '1' 906) and picocell-center clients (e.g., client node '4' 910) will only monitor 80% of the non-ABS subframes, which equates of a power savings of approximately 20% for downlink reception. By defining the scheduling options in the heterogeneous macrocell 502 and picocell 520 environment, all client nodes (e.g., client nodes '2' 908, '3' 912, and '4' 910) could potentially benefit from the restricted subframes for possible allocation, despite of whether it is in a macrocell 502 or a picocell 520. Examples of such potential client node power saving with various ABS configurations are listed in Table 1.

TABLE 1

| Number of ABS Per Radio Frame | Battery Saving for Macro Clients/Pico-Center-Clients at DL Reception | Battery Saving for Picocell-Edge-Clients at DL Reception |
|---|---|---|
| 2 | 20% | 80% |
| 4 | 40% | 60% |
| 6 | 60% | 40% |
| 8 | 80% | 20% |

Those of skill in the arts will realize that the scheduling options described herein are independent of the transmission of system information, paging information, and synchronization channel. As an example, if the client node is required to receive any of those channels on any subframes, it will wake up and continue to monitor the PDCCH/PDSCH regardless of the scheduling options defined above.

In various embodiments, the ABS pattern is signaled to both macrocell client nodes (e.g., client node '1' 906) and pico/femtocell client nodes (e.g., client nodes '2' 908, '3' 912, and '4' 910) either over broadcast signaling channel or dedicated signaling channels. In these and other embodiments, both the macrocell eNB and the pico/femtocell eNB signals the Scheduling Option Indicator (SOI) to the client node via the dedicated RRC signaling or the MAC control elements to enable client node battery savings. Accordingly, the SOI indicates the scheduling mode of the client node: ABS-only, non-ABS-only, and all subframes. In one embodiment, the SOI is 2 bits, as illustrated in Table 2:

TABLE 2

| 2-bit SOI Indication | |
|---|---|
| 00 | ABS Only |
| 01 | Non-ABS-Only |
| 10 | All Subframes |
| 11 | Reserved |

It will be appreciated that other mappings not included Table 2 are also possible. For example, '00' could mean "non-ABS-only." In another embodiment, the SOI could be a single bit, as illustrated in Table 3. The lack of a SOI indicator means the client node can be scheduled in all subframes.

TABLE 3

| 1-bit SOI Indication | |
|---|---|
| 0 | ABS Only |
| 1 | Non-ABS-Only |

In these various embodiments, the SOI indicator could be contained in any RRC messages transmitted from the eNB (macrocell or pico/femtocell) to the client node. For example, it could be contained in the RRCConnectionSetup message, RRCConnectionReconfiguration message, or RRCConnectionReestablishment message, etc. In particular, the SOI could be contained in any information elements (IE), such as IE RadioResourceConfigDedicated, IE MAC-MacConfig, or other IEs. In the following example, IE MAC-MainConfig is used, with the two bit SOI indicator shown in Table 2:

```
- - ASN1START
MAC-MainConfig ::=          SEQUENCE {
    ul-SCH-Config               SEQUENCE {
        maxHARQ-Tx                  ENUMERATED {
                                        n1, n2, n3, n5, n6, n7, n8,
                                        n10, n12, n16, n20, n24, n28
                                        spare2, spare1}
                                        OPTIONAL, - - Need ON
        periodicBSR-Timer           Enumerated {
                                        sf5, sf10, sf16, sf20, sf32,
                                        sf40, sf64, sf80, sf128,
                                        sf160, sf320, sf640, sf1280,
                                        sf2560, infinity, spare1}
                                        OPTIONAL, - - Need On
        retxBSR-Timer               ENUMERATED {
                                        sf320, sf640, sf1280, sf2560,
                                        sf5120, sf10240, spare2,
                                        spare1},
        ttiBundling                 BOOLEAN
    }                                   OPTIONAL, - - Need On
    drx-Config                  DRX-Config    OPTIONAL, - - Need On
    timeAlignmentTimerDedicated TimeAlignmentTimer,
    SchedulingOptionIndicator   INTEGER (0..2),
    phr-Config                  CHOICE {
        release                     NULL,
        setup                       SEQUENCE {
            periodicPHR-Timer           ENUMERATED  {sf10, sf20, sf50,
                                                    sf100, sf200,
```

-continued

```
        prohibitPHR-Timer            ENUMERATED    {sf500, sf1000,
                                                    infinty},
                                                   {sf0, sf10, sf20,
                                                    sf50, sf100,
                                                    sf200, sf500,
                                                    sf1000},
        dl-PathlossChange            ENUMERATED    {dB1, dB3, dB6,
                                                    infinity}
    }                                              OPTIONAL, - - Need On
}
...,
[[ sr-ProhibitTimer-r9              INTEGER       (0..7)
                                                  OPTIONAL, - - Need On
]]
}
DRX-Config                   CHOICE {
    release                      NULL,
    setup                        SEQUENCE {
        onDurationTimer              ENUMERATED {
                                        psf1, psf2, psf3, psf4, psf5,
                                        psf6, psf8, psf10, psf20,
                                        psf30, psf40, psf 50, psf60,
                                        psf80, psf100, psf200},
        drx-InactivityTimer          ENUMERATED {
                                        psf1, psf2, psf3, psf4, psf5,
                                        psf6, psf8, psf10, psf20,
                                        psf30, psf40, psf 50, psf60,
                                        psf80, psf100, psf200, psf300,
                                        psf500, psf750, psf1280,
                                        psf1920, psf2560, spare10,
                                        spare9, spare8, spare7,
                                        spare6, spare5, spare4,
                                        spare3, spare2, spare1},
        drx-RetransmissionTimer      ENUMERATED {
                                        psf1, psf2, psf4, psf6, psf8,
                                        psf16, psf24, psf33},
        longDRX-SycleStartOffset     CHOICE {
            SF10                         INTEGER (0..9),
            SF20                         INTEGER (0..19),
            SF32                         INTEGER (0..31),
            SF40                         INTEGER (0..39,
            SF64                         INTEGER (0..63,
            SF80                         INTEGER (0..79),
            SF128                        INTEGER (0..127),
            SF160                        INTEGER (0..159),
            SF256                        INTEGER (0..254),
            SF320                        INTEGER (0..319),
            SF512                        INTEGER (0..511),
            SF640                        INTEGER (0..639),
            SF1024                       INTEGER (0..1023),
            SF1280                       INTEGER (0..1279),
            SF2048                       INTEGER (0..2047),
            SF2560                       INTEGER (0..2559)
        }
        shortDRX                     SEQUENCE {
            shortDRX-Cycle               ENUMERATED {
                                            sf2, sf5, sf8, sf10, sf20,
                                            sf32, sf41, sf64, sf80, sf128,
                                            sf160, sf256, sf320, sf512,
                                            sf640},
            drxShortCycleTimer           INTEGER  (1..16)
        } OPTIONAL                                 -- Need OR
    }
}
-- ASN1STOP
```

Skilled practitioners of the art will be aware of current system implementations that have separate Channel State Information (CSI) measurement subsets configured for the user equipment (i.e., a client node). This configuration is implemented through explicit signaling from the eNB (i.e., access node) to avoid fluctuation of interference power due to ABS. In response, the user equipment (UE) reports CSI for each configured CSI measurement subframe subset to the eNB for the purpose of link adaptation. Accordingly, these same skilled practitioners of the art will realize that the CSI measurement subset is therefore related to the ABS pattern of the neighbor interfering macro/femto cells.

In various embodiments implemented with macrocells and picocells, the picocell (i.e., the eNB) configures a picocell-center-client with a CSI measurement subset corresponding to non-ABS-only and configures a picocell-edge-client with CSI measurement subset corresponding to ABS-only. In these various embodiments, the CSI measurement subset configuration is controlled by picocell and it is not required to have the same configuration as the ABS pattern. In one embodiment, the CSI measurement subset configured for a picocell-edge-client corresponds to a subset of the ABS pattern. The CSI measurement subset configured for a picocell-center-client corresponds to a subset of the non-ABS pattern. Accordingly, the client node does not need to know the exact ABS pattern. Instead, it only needs to be provided the CSI subset configuration to reduce its power consumption during channel monitoring operations.

In these and other embodiments, the client node is configured with one or more CSI measurement subsets. However, only subframes associated with some of the CSI measurement subsets are used for resource allocation. Therefore, an indicator, such as a one, two or multiple bit indicator, is added to establish an association with each CSI measurement subset to indicate whether the eNB intends to schedule the client node on the subframes configured in the subset. As an example, if the indicator is set to 1, the client node will monitor the PDCCH of the associated subframes in the CSI measurement subset for possible scheduling and dedicated resource allocation. Conversely, if the indicator is set to 0, the client node will not monitor the PDCCH of the associated subframes in the CSI measurement subset. Accordingly, the client node's power consumption will be reduced as it is not performing PDCCH blind decoding and PDSCH buffering and reception in the subframes associated with CSI measurement subset.

In these embodiments, the indicator is added in the Radio Resource Control (RRC) signaling associated with the CSI measurement subset configuration. In one embodiment, an additional indicator is added to the RRC signaling, such as the signaling associated with the CSI measurement subset configuration, to indicate to the client node whether it will be scheduled. In this embodiment, the scheduling is used to notify the client node whether it needs to monitor the PDCCH on subframes not belonging to any of the configured CSI measurement subsets. In another embodiment, an indicator is added to the RRC signaling associated with the CSI measurement subset configuration to indicate to the client node whether it will be scheduled. In this embodiment, the scheduling is used to notify the client node whether it needs to monitor the PDCCH only on the subframes associated with a configured CSI subsets or on all subframes.

Skilled practitioners of the art will likewise be aware of current system implementations that have configured a first restricted set of subframes for serving cell RRM/RLM measurements. These same implementations may likewise be configured with at least one second restricted set of subframes for neighbor cell RRM measurements for a client node. In various embodiments implemented with macrocells and picocells, the picocell client may be configured with a restricted set of subframes for serving picocell RRM/RLM measurements that correspond to the macrocell's ABS. In these various embodiments, the set of restricted subframes is also used for restricted scheduling of the client node (i.e., the picocell client) such that it is only scheduled on these subframes. In one embodiment, an indicator, such as a one-bit indicator, is added to the signaling to the client node to configure the restricted subframes for RRM/RLM measurements of the serving cell (i.e., the picocell). In this embodiment, the indicator is used to indicate to the client node whether it will be scheduled, and if so, whether it needs to monitor the PDCCH on the restricted subframes or on all subframes.

In various embodiments implemented with macrocells and femtocells, the macrocell client experiencing interference from a femtocell is configured with one or more restricted sets of subframes for serving macrocell RRM/RLM measurements that correspond to the femtocell's ABS. In certain of these various embodiments, neighbor cell RRM measurements are used instead or as well. In these various embodiments, this set of restricted subframes is used for restricted scheduling of the client node. That is, the client node is only scheduled on these subframes. In one embodiment, an indicator, such as a one-bit indicator, is added to the signaling to the client node. In this embodiment, the signaling configures the restricted subframes for RRM/RLM measurements of the serving cell and likewise configures the restricted subframes for RRM measurement of neighbor cells. As such, the indicator is used to indicate to the client node whether it will only be scheduled, and if so, whether it only needs to monitor the PDCCH on the restricted subframes or on all subframes.

In various embodiments implemented with macrocells and picocells, the macrocell client is configured with a restricted set of subframes for neighbor picocell RRM measurements that correspond to the macrocell's ABS. In this embodiment, since the macrocell client may not be scheduled on the ABS of the macrocell, an indicator (e.g. a one-bit indicator) is added to the signaling to the macrocell client for configuring the restricted subframes for RRM measurements of a neighboring pico cell. As such, the indicator is used to indicate to the client node whether it will only be scheduled, and if so, whether it only needs to monitor the PDCCH on the restricted subframes or on all subframes.

In one embodiment, the client node only monitors the PDCCH for possible resource allocation if the subframes are configured in the CSI measurement subset(s). Those of skill in the art will recognize that without CSI measurement feedback, the eNB will not know how to schedule or perform link adaptation for the client node in those subframes. However, the advantage of this embodiment is that no additional indicator is needed for possible resource allocation. In various embodiments implemented with macrocells and picocells, access node (i.e., the eNB) only configures one or more CSI measurement subsets associated with ABS subframes for picocell-edge-clients. Accordingly, the picocell-edge-clients do not monitor the subframes that are not configured in the CSI measurement subset(s) and thereby save power consumptions during those subframes. In these and other embodiments, the macrocell client is likewise configured with one or more CSI measurement subsets that may include the non-ABS subframes. Accordingly, the macrocell client does not monitor or decode the PDCCH/PDSCH of the subframes that are not included in the CSI measurement subsets. Furthermore, since the macrocell client is not configured to perform CSI measurement or PDCCH/PDSCH allocation during the non-configured subframes, it can turn off the RF receiver chain completely during those subframes to realize additional reductions in power consumption. It will be appreciated that the client node will monitor the PDCCH/PDSCH for all subframes that are included in the CSI measurement subsets if multiple CSI measurement subsets are configured. Likewise, if the subframe is not included in any of the CSI measurement subsets, then the client node will not monitor or decode the subframe.

Those of skill in the art will likewise appreciate that, in practice, the signaled client node RRM/RLM measurement subset may be constrained to the signaled client node CSI measurement subsets. Accordingly, further reductions in power consumption can be achieved since the client node only monitors the CSI measurement subsets as opposed to the combination of both the RRM/RLM measurement subsets and the CSI measurement subsets. Likewise, the signalled client node CSI measurement subset may be constrained to the signalled RRM/RLM measurement subset. Furthermore, the aforementioned features may be solely implemented by the appropriate access node (i.e., the eNB) to further reduce power consumption by the client node.

Figure 10:
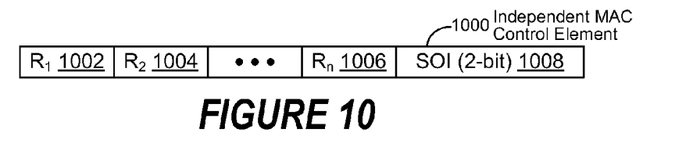
FIG. 10 is a simplified illustration of a Scheduling Option Indicator (SOI) transmitted as a MAC control element.

FIG. 10 is a simplified illustration of a Scheduling Option Indicator (SOI) transmitted as a MAC control element as implemented in accordance with an embodiment of the invention. In this embodiment, an independent MAC control element 1000 comprises reserved bits 'R$_1$' 1002, 'R$_2$' 1004 through 'R$_n$' 1006 and a two bit SOI 1008.

Figure 11:
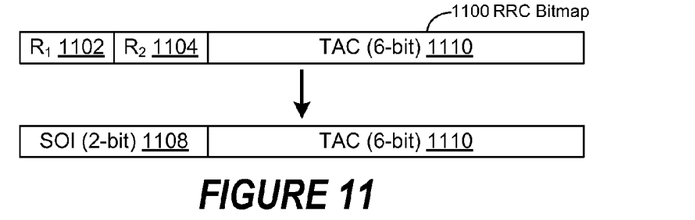
FIG. 11 is a simplified illustration of Radio Resource Control (RRC) signaling bitmap as implemented to indicate which ABS a client node should monitor via PDCCH.

FIG. 11 is a simplified illustration of using existing reserved bits in the Timing Advance Command (TAC) 1110 MAC Control Element (CE) to indicate which Almost Blank Subframes (ABS) a client node should monitor via Physical Downlink Control Channel (PDCCH). In this embodiment, macro/pico/femto eNBs indicate to the client node the subframes it will or will not need to monitor via a bitmap 1100. As shown in FIG. 11, the existing reserved bits in the TAC MAC CE 'R$_1$' 1102 and 'R$_2$' 1104 are mapped to a two bit Scheduling Option Indicator (SOI) 1108.

Skilled practitioners of the art will recognize that this and other embodiments are related to the implementation of Almost Blank Subframes (ABS) as described in greater detail herein. In these and other various embodiments, the signaling alternatives described in greater detail herein are applied to a restricted subframe set, which may be a subset of the ABS subframe set. In these various embodiments, ABS subframes could be exchanged with restricted subframes. Likewise, the restricted subframes may be a subset of the ABS subframes, or may be the same as the ABS subframes. For example, if a restricted subframe set 'X$_s$' is a subset of the ABS subframe set 'X', then the above described embodiments and signaling details could apply as well.

Skilled practitioners of the art will recognize that this approach provides flexibility, especially if the client nodes are in the coverage areas of multiple ABS patterns. For example, a macro client may be operating in an overlapped coverage area of multiple femtocells, with each femtocell having its own ABS pattern. To avoid femtocell interference, the macro client is scheduled during subframes that occur when all involved femtocells blank their transmissions. In this example, instead of sending multiple ABS patterns and SOI to the client node, it may be simpler to directly indicate to the client node the subframes that the client node needs or does not need to monitor PDCCH. A similar situation occurs if ABS is configured at both the macro and the pico/femto eNBs to increase the footprints of both layers.

From the foregoing, those of skill in the are will recognized that invention enables reduction of client node power consumption in a heterogeneous wireless-enabled communications environment with the application of enhanced inter-cell interference coordination (eICIC). Likewise, ABS is adopted in RAN1 as the time-domain eICIC solution to mitigate macro-to-pico interference. By defining the client node scheduling into different modes, the client node is not required to monitor PDCCH for resource allocation in a subset of the subframes. Thus, the client node can enter sleep mode during those non-allocated subframes. By applying the proposed solution, both macro clients and pico/femtocell clients can reduce power consumption. As an example, if two ABS are configured in a heterogeneous macrocell and picocell wireless environment, about 20% power savings can be achieved for macrocell and picocell-center-clients in RRC-Connected mode. About 80% powers saving can be achieved for picocell-edge-clients. Although the percentage of client node power savings varies from the configuration of ABS, a majority of client nodes in the network could potentially benefit from the proposed scheme. From a signaling perspective, only a two bit indicator in the RRC signaling is required to notify the client node of its scheduling option. Hence, the signaling overhead is negligible, while significant client node battery savings can be realized throughout a heterogeneous wireless-enabled communications environment.

Although the described exemplary embodiments disclosed herein are described with reference to reducing client node power consumption in a heterogeneous wireless-enabled communications environment, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A client node, comprising:
    processing logic operable to monitor a plurality of subframes on a downlink channel and to process a control signal comprising a restricted measurement set data;
    wherein said processing logic is further operable to cease monitoring predetermined subframes of said plurality of subframes based on said restricted measurement set data, said client node is further provided with a scheduling option, and said scheduling option is signaled via a scheduling option indicator (SOI).

2. The client node of claim 1, wherein said restricted measurement set data comprises at least one of the set of:
    Channel State Information (CSI) measurement set data;
    Radio Resource Management (RRM) measurement set data; and
    Radio Link Monitoring (RLM) measurement set data.

3. The client node of claim 1, wherein said scheduling option is signaled to said client node via a dedicated signaling message.

4. The client node of claim 1, wherein said scheduling option is provided to said client node implicitly.

5. The client node of claim 1, wherein said monitoring operations comprise monitoring of a Physical Downlink Control Channel (PDCCH).

6. The client node of claim 1, wherein said scheduling option is to monitor a PDCCH during said subframes within said restricted measurement set data.

7. The client node of claim 1, wherein said scheduling option is to monitor a PDCCH during said subframes not within said restricted measurement set data.

8. The client node of claim 1, wherein said SOI is communicated to said client node as a MAC Control element.

9. The client node of claim 1, wherein said SOI is communicated to said client node in a Radio Resource Control (RRC) message.

10. A method for reducing power consumption of a client node, comprising:
    using processing logic to monitor a plurality of subframes on a downlink channel and to process a control signal comprising a restricted measurement set data;
    wherein said processing logic is further operable to cease monitoring predetermined subframes of said plurality of subframes based on said restricted measurement set data, said client node is further provided with a scheduling option, and said scheduling option is signaled via a scheduling option indicator (SOI).

11. The method of claim 10, wherein said restricted measurement set data comprises at least one of the set of:
Channel State Information (CSI) measurement set data;
Radio Resource Management (RRM) measurement set data; and
Radio Link Monitoring (RLM) measurement set data.

12. The method of claim 10, wherein said scheduling option is signaled to said client node via a dedicated signaling message.

13. The method of claim 10, wherein said scheduling option is provided to said client node implicitly.

14. The method of claim 10, wherein said monitoring operations comprise monitoring of a Physical Downlink Control Channel (PDCCH).

15. The method of claim 10, wherein said scheduling option is to monitor a PDCCH during said subframes within said restricted measurement set data.

16. The method of claim 10, wherein said scheduling option is to monitor a PDCCH during said subframes not within said restricted measurement set data.

17. The method of claim 10, wherein said SOI is communicated to said client node as a MAC Control element.

18. The method of claim 10, wherein said SOI is communicated to said client node in a Radio Resource Control (RRC) message.

* * * * *